United States Patent [19]

Forter et al.

[11] 4,127,567
[45] Nov. 28, 1978

[54] BIS-(1-SUBSTITUTED PHENYLAZO-2-HYDROXYNAPHTHALENE-3-CARBOXAMIDO)NAPHTHALENES

[75] Inventors: Willy Forter, Allschwil; Hans-Rudolf Ott, Basel, both of Switzerland

[73] Assignee: Sandoz Ltd., Basel, Switzerland

[21] Appl. No.: 700,834

[22] Filed: Jun. 29, 1976

Related U.S. Application Data

[63] Continuation of Ser. No. 422,559, Dec. 6, 1973, abandoned.

[30] Foreign Application Priority Data

Dec. 12, 1972 [CH] Switzerland .................. 18034/72
Jan. 18, 1973 [CH] Switzerland ..................... 685/73

[51] Int. Cl.² ................ C09B 33/14; C09B 43/12
[52] U.S. Cl. ................ 260/174; 260/184; 260/578
[58] Field of Search ............ 260/174, 177, 184, 187, 260/188

[56] References Cited

U.S. PATENT DOCUMENTS

| | | | |
|---|---|---|---|
| 2,741,656 | 4/1956 | Schmid et al. | 260/174 X |
| 2,774,755 | 12/1956 | Schmid et al. | 260/174 |
| 2,888,453 | 5/1959 | Schmid et al. | 260/184 X |
| 3,691,149 | 9/1972 | Mueller et al. | 260/188 |

FOREIGN PATENT DOCUMENTS

| | | | |
|---|---|---|---|
| 2,260,558 | 6/1973 | Fed. Rep. of Germany | 260/174 |
| 45/11,029 | 4/1970 | Japan | 260/184 |
| 45/11,030 | 4/1970 | Japan | 260/184 |
| 529,201 | 11/1972 | Switzerland | 260/174 |
| 300,782 | 10/1954 | Switzerland | 260/174 |
| 1,058,749 | 2/1967 | United Kingdom | 260/177 |
| 1,037,988 | 8/1966 | United Kingdom | 260/184 |

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

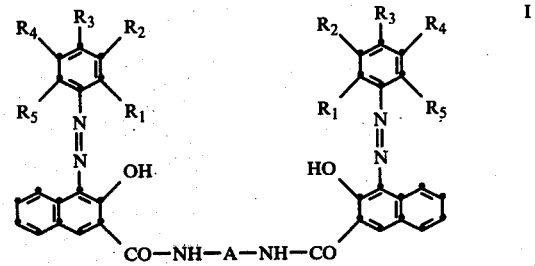

in which

A signifies a 1,4- or 1,5-naphthylene radical, unsubstituted or substituted by up to two substituents selected from chlorine, bromine, methyl, nitro, methoxy and cyano, the $R_1$'s, independently, signify halogen or nitro, and the $R_2$'s, $R_3$'s, $R_4$'s and $R_5$'s, independently, signify hydrogen, halogen or lower alkoxycarbonyl, with the proviso that i. each benzene nucleus bears at least two substituents, and ii. each benzene nucleus bears no more than one alkoxycarbonyl group, which, alone or in admixture one with another, are useful inter alia for pigmenting plastics in the mass and as pigmenting agents in surface coatings.

4 Claims, No Drawings

BIS-(1-SUBSTITUTED PHENYLAZO-2-HYDROXYNAPHTHALENE-3-CARBOXAMIDO)NAPHTHALENES

This application is a continuation of application Ser. No. 422,559, filed Dec. 6, 1973 and now abandoned.

The invention relates to disazo compounds.

According to the invention, there are provided compounds of formula I,

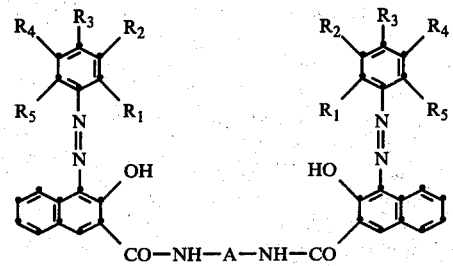

in which
  A signifies a 1,4- or 1,5-naphthylene radical, unsubstituted or substituted by up to two substituents selected from chlorine, bromine, methyl, nitro, methoxy and cyano,
  the $R_1$'s, independently, signify halogen or nitro, and
  the $R_2$'s, $R_3$'s, $R_4$'s and $R_5$'s, independently, signify hydrogen, halogen or lower alkoxycarbonyl, with the proviso that
    i. each benzene nucleus bears at least two substituents, and
    ii. each benzene nucleus bears no more than one alkoxycarbonyl group.

Where, in the compound of formula I, any $R_1$ signifies a nitro group, the corresponding $R_4$, i.e. the $R_4$ on the same benzene nucleus, preferably signifies hydrogen or a lower alkoxycarbonyl radical.

In the compounds of formula I, the alkyl moiety in any alkoxycarbonyl radical is preferably of 1 to 4 carbon atoms, examples of such alkoxycarbonyl radicals being methoxycarbonyl, ethoxycarbonyl, n-propoxycarbonyl and butoxycarbonyl. The naphthalene nucleus A, at least from an economical standpoint, is preferably unsubstituted. Any halogen in the compounds of formula I, as $R_1$, $R_2$, $R_3$, $R_4$ or $R_5$, is preferably chlorine or bromine.

Preferred compounds of formula I are the compounds of formula I'

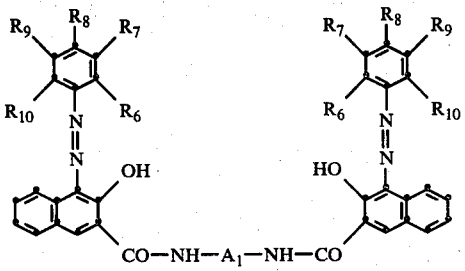

in which
  $A_1$ signifies a 1,4- or 1,5-naphthylene radical,
  the $R_6$'s, independently, signify chlorine or bromine, and
  the $R_7$'s, $R_8$'s, $R_9$'s and $R_{10}$'s, independently, signify hydrogen, chlorine, bromine, methoxycarbonyl or ethoxycarbonyl,
  with the proviso that each benzene nucleus has at least two substituents but not more than one alkoxycarbonyl group.

In the compounds of formula I', both diazo component radicals are preferably the same, i.e. the $R_6$'s the same, the $R_7$'s the same, the $R_8$'s the same, etc. In the compounds of formula I', the benzene nuclei are preferably disubstituted, the second substituent (additional to the chlorine or bromine as $R_6$) preferably being chlorine, bromine or methoxycarbonyl.

The invention also includes mixtures of compounds of formula I, which mixtures may be obtained, for example, by simple admixture of individual compounds or by employing, in the production of the compounds, at least two dissimilar diazo components, e.g. by employing two diazo components in which the $R_1$'s are different or the $R_2$'s are different, etc., a mixture is obtained comprising a first compound of formula I bearing two identically substituted benzene nuclei corresponding to the first diazo component, a second compound of formula I bearing two identically substituted benzene nuclei corresponding to the second diazo component and a third compound of formula I bearing two differently substituted benzene nuclei derived from the first and second diazo components.

The invention also provides a process for the production of compounds of formula I, which process comprises (a) condensing a compound of formula II,

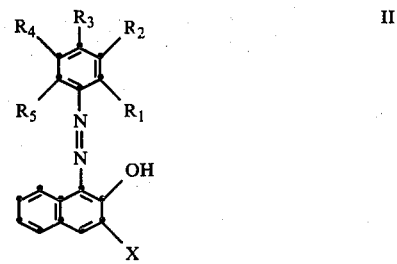

in which
  $R_1$, $R_2$, $R_3$, $R_4$ and $R_5$ are as defined above, and
  X signifies a carboxyl group or a functional derivative thereof,
or a mixture of two compounds of formula II, with a diamine of formula III, $$H_2N - A - NH_2 \qquad III$$

in which A is as defined above, or
(b) coupling a diamine of formula IV,

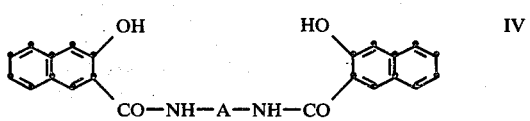

with a diazotized amine of formula VI,

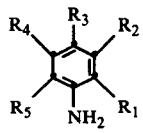

or with a mixture of two diazotized amines of formula VI.

In process (a), where a single compound of formula II is employed, two moles of such compound are preferably employed to each mole of the diamine of formula III and, where two compounds of formula II are employed, x moles of one and 2-x moles of the other are are preferably employed, x signifying 0.02 to 1. Similarly, in process (b), where a single diazotized amine of formula VI is employed, two moles thereof are preferably employed to each mole of the diamide of formula IV and, where two compounds of formula VI are employed, x moles of one and 2-x moles of the other are preferably employed, x being as defined above.

Process (a) may be carried out in conventional manner. As examples of functional derivatives of the carboxyl group (X) may be given the lower alkyl esters, e.g. of 1 to 4 carbon atoms, and the acid halide, particularly the acid chloride, derivatives thereof. The reaction, particularly where an acid halide derivative is employed, is preferably carried out at high temperatures, for example between 70° and 150° C and in an organic, preferably aromatic, solvent. Particularly where the acid chloride derivative is employed, the reaction is preferably carried out in the presence of an acid binding agent, e.g. an anhydrous alkali metal acetate, bicarbonate or carbonate, or an organic base such as pyridine.

Process (b) may be carried out in conventional manner, for example by adding to a solution of the diazotized amine of formula VI, adjusted to a pH of 4 to 6, a solution of the compound of formula IV in alkaline medium.

The resulting compounds of formula I may be isolated in conventional manner and with ease since such compounds are sparingly soluble both in aqueous media and organic solvents.

The compounds of formula II used in process (a) may be obtained by diazotizing the amine of formula VI and then coupling with 2-hydroxynaphthalene-3-carboxylic acid, the functional derivative of the carboxy group, where required, being obtained in conventional manner, e.g. by esterification using $C_{1-4}$ alcohols or by halogenation. The halogenation is preferably carried out using phosphorus chlorides or bromides or thionyl chloride. Such halogenation is preferably carried out in an inert organic, preferably aromatic, solvent such as toluene, xylene, nitrobenzene or chlorobenzene, optionally in the presence of dimethylformamide or acetamide. A suitable temperature for the halogenation is up to the boiling point of the reaction mixture.

The compounds of formula VI are known or may be obtained in conventional manner from available starting materials.

The diamide of formula IV used in process b) may be obtained by condensing 2-hydroxynaphthalene-3-carboxylic acid, or a functional derivative thereof, with a diamine of formula III. The reaction is carried out in conventional manner, e.g. as described above for process a). Where the free acid is employed, it is preferred to carry out the reaction in the presence of a condensation agent, e.g. phosphorous trichloride.

The diamines of formula III are known or may be obtained in conventional manner from available starting materials.

The compounds of formula I and mixtures thereof are useful as pigments. They are indicated for use in the pigmentation of plastics in the mass, either in the presence of or absence of solvents. As examples of plastics may be given polyethylene, polystyrene, polyvinyl chloride, rubber and synthetic leather, as well as fibres of viscose or cellulose acetate where the compounds may be incorporated in the spinning solutions. They are also indicated for use in surface coatings, whether of an oil or water base, and lacquers and for use in printing inks, dyeing paper in the stock and for coating or printing textiles.

For such uses, the compounds of formula I and mixtures thereof are used in conventional manner and in conventional amounts depending on the particular effect required.

The compounds have notable fastness to light, weathering, migration, efflorescence, overspraying and solvents and good stability to chemicals, particularly to $SO_2$ and to alkali. Particularly, the compounds have good light fastness in metallized lacquer media. Further, they have good application properties such as fastness to flocculation and good covering power.

The invention is illustrated by the following Examples, in which all parts and percentages are by weight and the temperature in degrees Centigrade.

EXAMPLE 1

29 Parts of the dry monoazocarboxylic acid of the formula

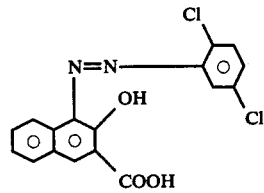

formed by coupling diazotized 2,5-dichloroaniline and 2-hydroxynaphthalene-3-carboxylic acid, are entered into 180 parts of chlorobenzene, 1 part of dimethylformamide and 10 parts of thionyl chloride. The reaction solution is raised to 105°–110° and stirred for 6 hours. It is then cooled in an ice bath and the precipitated acid chloride is filtered off, washed with 200 parts of petroleum ether and dried at 60° in a vacuum.

21 Parts of the dry monoazocarboxylic acid chloride of formula

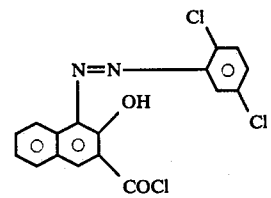

are heated together with 260 parts of 1,2-dichlorobenzene to 110°, 3.9 parts of 1,5-diaminonaphthalene, dissolved in 120 parts of 1,2-dichlorobenzene, are added and the mixture is heated to 145° over the course of 18 hours. Thereupon, the pigment settles out in insoluble finely crystalline form. It is separated from the solvent by filtration while still hot and washed, first with hot 1,2-dichlorobenzene, then with methanol and finally with water, and dried at 80° to 100° in a vacuum. Applied on polyvinyl chloride the obtained pigment gives reddish-brown dyeings. The pigment shows notable light fastness, heat stability and migration resistance and good distribution in plastic mediums.

EXAMPLE 2

30.4 Parts of the dry monoazocarboxylic acid of the formula

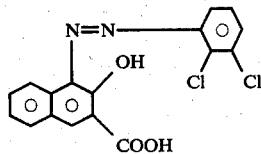

formed by coupling diazotized 2,3-dichloroaniline and 2-hydroxynaphthalene-3-carboxylic acid are added to 300 parts of 1,2-dichlorobenzene and 15 parts of thionyl chloride, and the mixture is heated to 105° to 110° over the course of 6 hours while stirring. The reaction solution is cooled to 70° to 80° and the excess thionyl chloride, together with a small quantity of 1,2-dichlorobenzene, is distilled off under vacuum. 6.3 Parts of 1,4-diaminonaphthalene, dissolved in 130 parts of 1,2-dichlorobenzene, are added to the resulting solution which is condensed at 175° to 180° over the course of 15 hours while stirring. Thereupon, the pigment settles out in insoluble, finely crystalline form. It is separated from the solvent by filtration while still hot and washed, first with hot 1,2-dichlorobenzene, then with methanol and finally with water, and dried at 80° to 100° under vacuum. Applied on polyvinyl chloride the resulting pigment gives brown dyeings with notable light fastness and heat and migration resistance.

EXAMPLE 3

30.4 Parts of the dry monoazocarboxylic acid mixture consisting of 90% of the compound of the formula

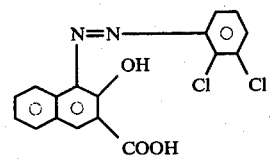

and 10% of the compound of the formula

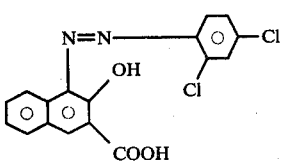

formed by coupling the corresponding amounts of diazotized 2,3-dichloroaniline and 2,4-dichloro-aniline with 2-hydroxynaphthalene-3-carboxylic acid, are added to 300 parts of 1,2-dichlorobenzene and 15 parts of thionyl chloride, and the mixture is heated to 105° to 110° over the course of 6 hours while stirring. The reaction solution is then cooled to 70° to 80° and the excess thionyl chloride, together with a small quantity of 1,2-dichlorobenzene, is distilled off under vacuum. 6.3 Parts of 1,4-diaminonaphthalene, dissolved in 130 parts of 1,2-dichlorobenzene, are added to the resulting solution which is condensed at 175° to 180° over the course of 15 hours while stirring. Thereupon, the pigment mixture settles out in insoluble, finely crystalline form. It is separated from the solvent by filtration while still hot and washed, first with hot 1,2-dichlorobenzene, then with methanol and finally with water, and dried at 80° to 100° under vacuum. Applied on polyvinyl chloride the obtained pigment mixture gives brown dyeings with good light fastness and heat and migration resistance.

The dyes of formula I specified in the table below are produced in accordance with the procedures of Example 1 or 2.

TABLE 1

| Expl No. | $R_1$ | $R_2$ | $R_3$ | $R_4$ | $R_5$ | A | Shade in PVC |
|---|---|---|---|---|---|---|---|
| 4 | Cl | H | Cl | H | H | 1,5-naphthylene | reddish-brown |
| 5 | Cl | H | H | Cl | H | 1,4-naphthylene | brown |
| 6 | Cl | Cl | H | H | H | 1,5-naphthylene | brown |
| 7 | Br | Br | H | H | H | " | brown |
| 8 | Br | H | H | Br | H | " | reddish-brown |
| 9 | Cl | Cl | Cl | H | H | " | brown |
| 10 | Cl | H | Cl | Cl | H | 1,4-naphthylene | brown |
| 11 | Cl | H | Cl | Cl | H | 1,5-naphthylene | brown |
| 12 | Cl | Cl | Cl | Cl | Cl | " | brown |
| 13 | $NO_2$ | H | Cl | H | H | 1,4-naphthylene | reddish brown |
| 14 | $NO_2$ | H | Cl | H | H | 1,5-naphthylene | brown |
| 15 | $NO_2$ | H | H | H | Br | " | brown |
| 16 | Cl | H | H | —COOCH$_3$ | H | " | brown |
| 17 | Br | H | H | —COOC$_2$H$_5$ | H | " | brown |
| 18 | Cl | H | H | Cl | H | 2-chloro-1,4-naphthylene | |
| 19 | Cl | Cl | H | H | H | 2-bromo-1,4-naphthylene | brown |
| 20 | Cl | H | H | Cl | H | 6-chloro-1,5-naphthylene | brown |
| 21 | Cl | Cl | H | H | H | 8-methyl-1,4-naphthylene | brown |
| 22 | Cl | Cl | H | H | H | 8-methoxy-1,5-naphthylene | brown |
| 23 | $NO_2$ | H | H | Cl | H | 1,5-naphthylene | brown |

Following the procedure of Example 3 but employing the mixtures of compounds of formula II and the compound of formula III given in the following table, there are similarly obtained pigment mixtures which pigment PVC in the colour given in the right hand column.

TABLE 2:

| Expl No. | Mixture Composition of Compounds II | $R_1$ | $R_2$ | $R_3$ | $R_4$ | $R_5$ | Compound III | Shade in PVC |
|---|---|---|---|---|---|---|---|---|
| 24 | 90% | Cl | Cl | H | H | H | 1,5-Diamino-naphthalene | brown |
|    | 10% | Cl | H | H | Cl | H | | |
| 25 | 50% | Cl | Cl | H | H | H | " | " |
|    | 50% | Cl | H | H | Cl | H | | |
| 26 | 10% | Cl | Cl | H | H | H | " | reddish brown |
|    | 90% | Cl | H | H | Cl | H | " | |
| 27 | 95% | $NO_2$ | H | Cl | H | H | " | brown |
|    | 5% | Cl | H | H | Cl | H | | |
| 28 | 70% | $NO_2$ | H | Cl | H | H | " | " |
|    | 30% | Cl | H | H | Cl | H | | |
| 29 | 90% | Cl | Cl | H | H | H | 1,4-Diamino-naphthalene | " |
|    | 10% | Cl | H | H | Cl | H | | |
| 30 | 90% | Cl | H | Cl | H | H | 1,5-Diamino-naphthalene | " |
|    | 10% | Cl | H | H | Cl | H | | |

TABLE 2:-continued

| Expl No. | Mixture Composition of Compounds II | $R_1$ | $R_2$ | $R_3$ | $R_4$ | $R_5$ | Compound III | Shade in PVC |
|---|---|---|---|---|---|---|---|---|
| 31 | 50% | Cl | Cl | H | H | H | " | " |
|    | 50% | Cl | H  | Cl| H | H | " | " |
| 32 | 60% | Cl | H  | Cl| H | H | " | " |
|    | 40% | Cl | H  | H | Cl| H | " | " |

Application Example

2 Parts of the pigment of Example 1, salt-ground in accordance with conventional methods, are ground in a ball mill over the course of 24 hours with 48 parts of a lacquer of the following composition.

Composition of the lacquer:
 43.88 parts of a 60% solution of alkyd-melamine formaldehyde resin in xylene,
 17.18 parts of a 65% melamine resin solution in butanol,
 4.57 parts of butanol,
 31.37 parts of xylene and
 7 parts of ethyl glycol acetate.

The lacquer containing the pigment is separated from the balls by means of a nylon filter, and an aluminum sheet (on cardboard) is sprayed with this "full shade mixture". The sheet sprayed in this way is allowed to dry in the air for 15 minutes and then stoved 30 minutes at 140°. The reddish-brown film thus obtained shows good light and migration fastness.

What is claimed is:

1. A compound of having the formula

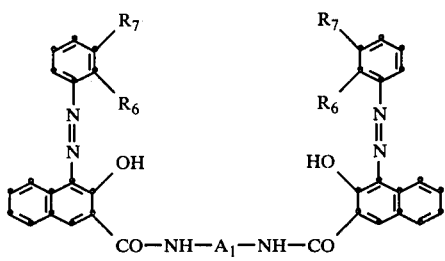

wherein $A_1$ is 1,4-naphthylene or 1,5-naphthylene, and each $R_6$ and $R_7$ is chloro or bromo.

2. The compound according to claim 1 having the formula

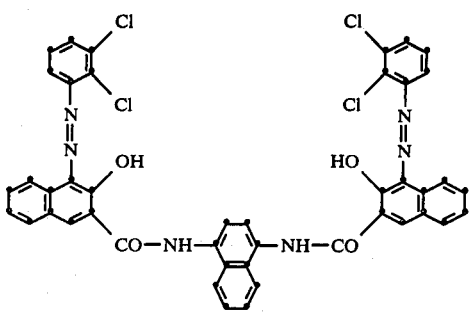

3. The compound according to claim 1 having the formula

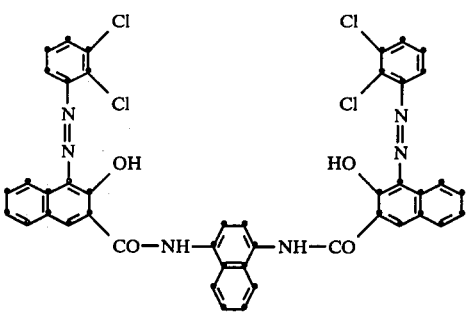

4. The compound according to claim 1 having the formula

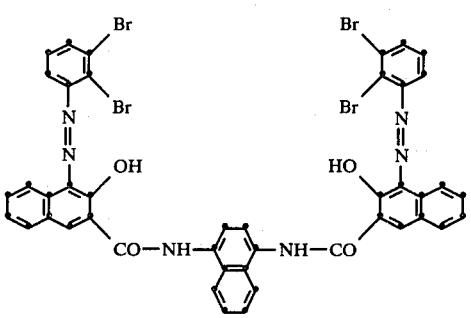

* * * * *